US009488744B2

United States Patent
Thomsen et al.

(10) Patent No.: US 9,488,744 B2
(45) Date of Patent: Nov. 8, 2016

(54) SYSTEM AND METHOD FOR ESTIMATING SEISMIC ANISOTROPY WITH HIGH RESOLUTION

(71) Applicant: University of Houston System, Houston, TX (US)

(72) Inventors: Leon Thomsen, Houston, TX (US); Rongrong Lin, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 150 days.

(21) Appl. No.: 14/476,315

(22) Filed: Sep. 3, 2014

(65) Prior Publication Data

US 2015/0063067 A1 Mar. 5, 2015

Related U.S. Application Data

(60) Provisional application No. 61/873,101, filed on Sep. 3, 2013.

(51) Int. Cl.
*G01V 1/28* (2006.01)
*G01V 1/36* (2006.01)
*G01V 1/30* (2006.01)

(52) U.S. Cl.
CPC .............. *G01V 1/282* (2013.01); *G01V 1/30* (2013.01)

(58) Field of Classification Search
CPC ......... G01V 1/282; G01V 1/364; G01V 1/30
USPC ...................................... 367/43, 73
See application file for complete search history.

(56) References Cited

U.S. PATENT DOCUMENTS

| 6,944,094 B1 * | 9/2005 | Thomsen ............... G01V 1/48 367/25 |
| 2011/0069581 A1 | 3/2011 | Krohn |
| 2012/0046871 A1 | 2/2012 | Naville et al. |

FOREIGN PATENT DOCUMENTS

| CN | 103149588 | * 6/2013 |
| KR | 20040110299 A | 12/2004 |
| WO | 0055647 A1 | 9/2000 |

OTHER PUBLICATIONS

International Patent Application No. PCT/US2014/053886, International Search Report and Written Opinion dated Nov. 28, 2014, 9 pages.

* cited by examiner

*Primary Examiner* — Daniel L Murphy
(74) *Attorney, Agent, or Firm* — Conley Rose, P.C.

(57) ABSTRACT

A system and method for estimating seismic anisotropy of subsurface formations with high resolution. A method for determining anisotropy parameters of subsurface formations includes generating a synthetic reflectivity gather from a vertical well log. Times of a surface seismic gather are adjusted to those of the synthetic gather. Low-cut filtering is applied to the surface seismic gather. Anisotropy parameters are generated as a difference of the filtered seismic gather and the synthetic gather. An anisotropy value is assigned to each of plurality of layers of a formation based on the generated anisotropy parameters.

20 Claims, 3 Drawing Sheets

SYSTEM AND METHOD FOR ESTIMATING SEISMIC ANISOTROPY WITH HIGH RESOLUTION

CROSS-REFERENCE TO RELATED APPLICATIONS

This application claims the benefit of U.S. provisional patent application Ser. No. 61/873,101 filed Sep. 3, 2013, and entitled "System and Method for Estimating Seismic Anisotropy with High Resolution," which is hereby incorporated by reference in its entirety for all purposes.

BACKGROUND

Anisotropy is the variation of a physical property depending on the direction in which the property is measured. Anisotropy is a common phenomenon in various scientific fields, such as medical science, physics, and engineering. In the field of geophysics, anisotropy most often refers to seismic anisotropy. Seismic anisotropy is the dependence of seismic velocity upon angle, and can arise from intrinsic anisotropy of the rock itself, or from stress-induced anisotropy caused by a difference of directional stresses in formation layers. The application of seismic anisotropy has substantially improved the exploration of hydrocarbons, by modifying the velocity model from simple isotropic to more realistic anisotropic. Seismic anisotropy has played a role in applications such as long offset seismic data with greater angles of incidence (the angle-dependence of velocity is more evident), AVO (Amplitude versus offset) quantitative analysis, and anisotropic imaging (migration).

SUMMARY

A system and method for high resolution estimation of seismic anisotropy are disclosed herein. In one embodiment, a method for determining anisotropy parameters of subsurface formations includes generating a synthetic reflectivity gather from a vertical well log. Times of a surface seismic gather are adjusted to those of the synthetic gather. Low-cut filtering is applied to the surface seismic gather. Anisotropy parameters are generated as a difference of the filtered seismic gather and the synthetic gather. An anisotropy value is assigned to each of plurality of layers of a formation based on the generated anisotropy parameters.

In another embodiment, a non-transitory computer-readable medium is encoded with instructions that are executable to cause a processor to generate a synthetic reflectivity gather from a vertical well log, and to adjust times of a surface seismic gather to those of the synthetic gather. The instructions also cause the processor to low-cut filter the surface seismic gather, and generate anisotropy parameters as a difference of the filtered seismic gather and the synthetic gather. The instructions further cause the processor to assign an anisotropy value to each of plurality of layers of a formation based on the generated anisotropy parameters.

In a further embodiment, a system for determining anisotropy parameters of subsurface formations includes a processor and anisotropy extraction instructions. The anisotropy extraction instructions configure the processor to generate a synthetic reflectivity gather from a vertical well log, and to adjust the times of a surface seismic gather to those of the synthetic gather. The anisotropy extraction instructions also configure the processor to low-cut filter the surface seismic gather, and to generate anisotropy parameters as the difference of the filtered seismic gather and the synthetic gather. The anisotropy extraction instructions further configure the processor to assign an anisotropy value to each of plurality of layers of a formation based on the generated anisotropy parameters.

BRIEF DESCRIPTION OF THE DRAWINGS

For a detailed description of various examples, reference will now be made to the accompanying drawings in which.

NOTATION AND NOMENCLATURE

Figure 1:
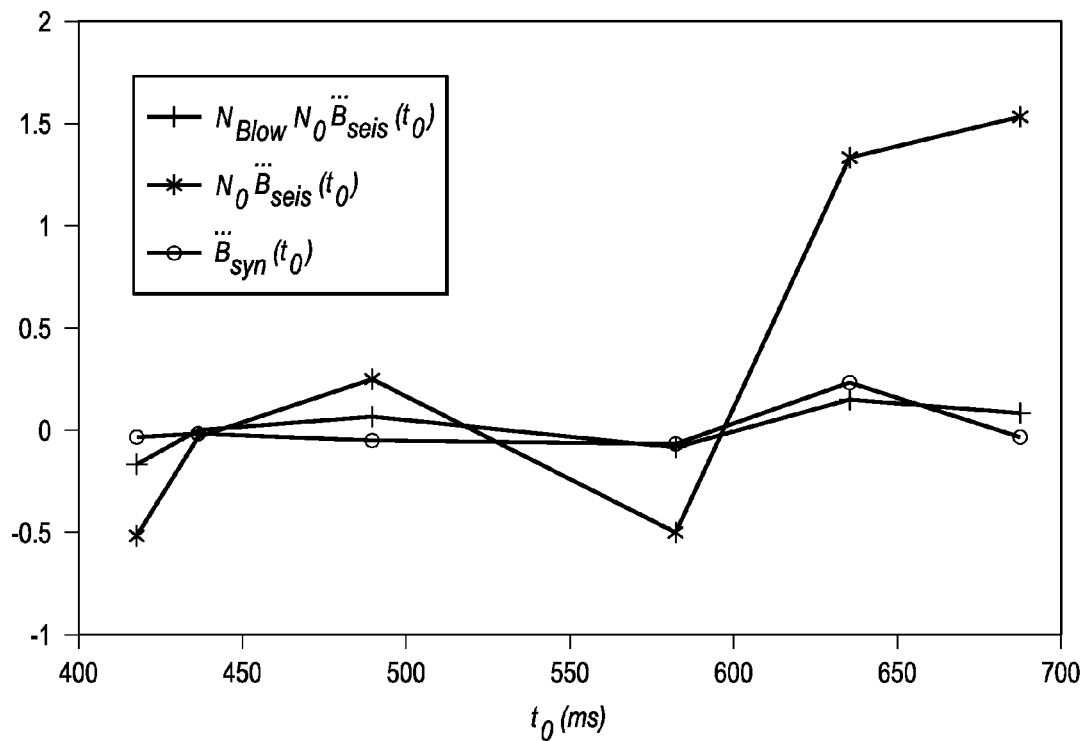
FIG. 1 shows results of application of extraction of anisotropy parameters from an exemplary dataset in accordance with principles disclosed herein.

Certain terms are used throughout the following description and claims to refer to particular system components. As one skilled in the art will appreciate, different organizations may refer to a component by different names. In the following discussion and in the claims, the terms "including" and "comprising" are used in an open-ended fashion, and thus should be interpreted to mean "including, but not limited to . . . ."

The term "anisotropy" is herein used to mean "seismic anisotropy." Except where otherwise noted, "anisotropy" is further specified to mean "polar anisotropy", also known as "Transverse Isotropy." Except where otherwise noted, "anisotropy" is further specified to mean P-wave anisotropy. Except where otherwise noted, "anisotropy" is yet further specified to be measured by the parameters $\delta$ and $\epsilon$, as defined in Leon Thomsen, *Weak Elastic Anisotropy*, 51 GEOPHYSICS 1954 (1986).

The recitation "based on" is intended to mean "based at least in part on." Therefore, if X is based on Y, X may be based on Y and any number of other factors.

DETAILED DESCRIPTION

The following discussion is directed to various embodiments of the invention. One skilled in the art will understand that the following description has broad application, and the discussion of any embodiment is meant only to be exemplary of that embodiment, and not intended to intimate that the scope of the disclosure, including the claims, is limited to that embodiment.

In oil and gas contexts, shale is commonly the lithology with the most significant anisotropy. A method of directly obtaining anisotropy parameters of shale involves measuring the shale sample in a laboratory, using, for example, acoustic travel time measurements in various directions. However, under lab conditions, the frequencies applied (ultrasonic) are different from those of seismic waves, and the state of stress may be different from that in the subsurface, so the rocks may not exhibit the same anisotropy as when underground. More fundamentally, the sample necessarily constitutes only a small portion of the subsurface formation, and so any measurement on the sample may or may not be representative of a larger volume. An in-situ measurement, at appropriate scale, is preferable.

Other conventional methods to measure anisotropy use surface seismic data and Vertical Seismic Profiling (VSP) data, using in particular the arrival times of various identifiable reflections. These seismic arrival-time methods, such as those which measure vertical, hyperbolic, and non-hyperbolic "moveout", produce estimates of anisotropy which have low spatial resolution, and therefore cannot be used in AVO studies, which can have much higher spatial resolution. Given a borehole of sufficient depth, and a co-located Common Depth Point ("CDP") gather of surface seismic data, the anisotropy parameter $\delta$ may be determined, with low resolution in vertical time $t_0$, by comparison of the (seismic band) vertical velocity $V_{P0seis}$ (e.g. from a VSP) with the moveout velocity $V_{NMO}$ (from the CDP gather):

$$V_{NMO}(t_0) = V_{P0seis}(t_0)(1+\delta(t_0)) \quad (1)$$

However, if performed with excessively fine resolution in $t_0$, this calculation becomes numerically unstable. The method and system disclosed herein remedy this situation by using seismic and sonic amplitudes.

Anisotropy logging, or cross-dipole logging, is another known technique for measuring anisotropy. This type of log uses two dipole transmitters perpendicular to each other, and arrays of two dipole receivers, similarly oriented, and measures fast and slow shear-slowness and fast-shear azimuth. This method is disadvantageous in that it is highly dependent on the borehole environment, and has dispersion characteristic of dipole flexural waves. More fundamentally, it measures azimuthal shear-wave velocity, whereas the present disclosure estimates polar P-wave anisotropy. Those skilled in the art will understand that shear waves are polarized mainly perpendicular to their direction of propagation, whereas P-waves are polarized mainly parallel to their direction of propagation, and that "azimuthal anisotropy" refers to variation of velocity with respect to the azimuthal angle, whereas "polar anisotropy" refers to variation of velocity with respect to the polar angle (e.g. from the vertical).

Embodiments of the present disclosure extract seismic polar anisotropy parameters, with the vertical resolution of the seismic wavelet, from prestack surface seismic data and vertical well logs. The method uses sonic $V_{P0}$, $V_{S0}$, and $\rho$ (from logs), convolved with the (zero-phase) seismic wavelet from a co-located surface CDP gather) to construct an isotropic synthetic reflectivity gather. This synthetic gather contains only those propagation effects which are encoded in that seismic wavelet. The seismic data is adjusted, in ways known to those skilled in the art, and described further below. The jump in anisotropy parameters $\delta$ and $\epsilon$ at each major reflector in the logged interval is derived from the arithmetic difference between the adjusted seismic amplitudes and the isotropic synthetic amplitudes. Integration of these differences, starting at a sandstone layer (with anisotropy assumed zero), yields a profile of the anisotropy.

Embodiments begin by processing log data, for vertical velocities $V_{P0}$, $V_{S0}$, and density $\rho$, recorded and quality-controlled in ways familiar to those skilled in the art, in a vertical borehole penetrating horizontal formations with assumed polar anisotropic symmetry. If the borehole is not vertical, or if the formations are not horizontal, the present embodiment may be modified accordingly, by one skilled in the art. If $V_{S0}$ is not measured, it may be estimated, with corresponding reduction in confidence of the resulting computation. The depths are converted to vertical travel times using methods known in the art. At every logged point, and for a variety of assumed polar angles of incidence $\theta$, a linearized isotropic reflection coefficient may be computed. (E.g. LEON THOMSEN, UNDERSTANDING SEISMIC ANISOTROPY IN EXPLORATION AND EXPLOITATION (Soc'y. of Exploration. Geophysicists, 2002).

$$R_{iso}(t_0, \theta) \cong A_{iso} + B_{iso}\sin^2\theta + C_{iso}\sin^2\theta\tan^2\theta, \quad (2)$$

with $$A_{iso}(t_0) = \frac{\Delta Z_{P0}}{2\overline{Z}_{P0}} \quad (3)$$

$$B_{iso}(t_0) = \frac{1}{2}\left[\frac{\Delta V_{P0}}{\overline{V}_{P0}} - \left(\frac{2\overline{V}_{S0}}{\overline{V}_{P0}}\right)^2 \frac{\Delta \mu_0}{\overline{\mu}_0}\right]$$

$$C_{iso}(t_0) = \frac{1}{2}\left[\frac{\Delta V_{P0}}{\overline{V}_{P0}}\right]$$

where $Z_{P0} = \rho V_{P0}$ is vertical impedance, $\mu_0 = \rho V_{S0}^2$ is vertical shear modulus, $\Delta$ indicates a jump in properties between adjacent logged intervals (lower-upper), and the bar indicates an average of these interval values.

Embodiments apply a co-located CDP gather of surface seismic data, using methods known in the art. The gather may be processed (pre-stack) to eliminate multiples and other noise, and converted to the angle domain. The gather should not be migrated, unless the migration algorithm which is applied preserves relative amplitudes well. A super-gather may be used to increase signal/noise. The gather may be time-shifted and stretched/compressed in time to tie the synthetic gather (equation (3)). The gather may be transformed to zero phase, and a wavelet $w(t_0)$ may be extracted. The gather may be filtered so that this wavelet is independent of incidence angle.

The wavelet is convolved with the reflectivity (equation (1)) to yield a flattened synthetic isotropic reflectivity gather:

$$S_{syn}(t_0, \theta) \equiv w(t_0) * R_{iso}(t_0, \theta) \quad (4)$$
$$= A_{syn}(t_0) + B_{syn}(t_0)\sin^2\theta + C_{syn}(t_0)\sin^2\theta\tan^2\theta,$$

where $$A_{syn}(t_0) \equiv w(t_0) * A_{iso}(t_0) \quad (5)$$
$$B_{syn}(t_0) \equiv w(t_0) * B_{iso}(t_0)$$
$$C_{syn}(t_0) \equiv w(t_0) * C_{iso}(t_0)$$

are computed quantities. Apart from propagation effects expressed by the seismic wavelet, there are no other propagation effects in $s_{syn}$.

The "convolutional model" of scalar seismic wave propagation describes this gather as:

$$s_{seis}(t,\theta) = C(t,\theta)*I(t,\theta)*P_\uparrow(t,\theta)*r(t,\theta)*P_\downarrow(t,\theta)*w_0(t)$$
$$*S_0(\theta), \quad (6)$$

which recounts the history of the wave, right-to-left. The operators shown above (discussed below) show an explicit dependence on the incidence wavefront-angle $\theta$ at the eventual reflector, with an implicit dependence on the local ray-angle along the raypath. Since the operators depend upon frequency, and the frequency components combine linearly, the operations combine as convolutions.

The source-strength $S_0(\theta)$ includes the intrinsic source directivity, and also the interaction with the free surface (ghost, etc.). The time-signature of the source is given by the initial wavelet $w_0(t)$. The downward-propagating operator $P_\downarrow(\theta,t)$ includes the effects of geometric spreading, attenuation, transmission coefficients, "friendly multiples", focusing/defocussing, etc. The reflectivity series r(θ,t) is discussed below.

The upward-propagating operator $P_\uparrow(\theta,t)$ includes the same effects as $P_\downarrow(\theta,t)$ but driven by the properties of the local medium on the upward leg of the ray. The instrumental operator I(θ,t) includes the instrumental impulse response, including coupling effects, as well as the interaction with the free surface at the receiver location. The computational operator C(θ,t) includes any processing that may have been done on the data.

Embodiments augment C(θ,t) to include time-flattening of the gather, and since convolution commutes, re-arrange equation (6) as $$S_{seis}(t_0, \theta) = [C(t_0, \theta) * I(t_0, \theta) * P_\uparrow(t_0, \theta) * \quad (7)$$
$$P_\downarrow(t_0, \theta) * S_0(\theta) * w_0(t_0)] * r(t_0, \theta)$$
$$= [P(t_0, \theta) * w(t_0)] * r(t_0, \theta)$$

where the propagation operator $P(t_0,\theta)$ is compact notation for all the operators included in the square bracket above, and where $w(t_0)$ is the observed seismic wavelet.

Embodiments assume that the reflectivity series $r(t_0,\theta)$ is the linearized plane-wave P-reflectivity for polar anisotropic media:

$$r(t_0,\theta) \equiv R_{aniso}(t_0,\theta) \equiv A_{aniso} + B_{aniso}\sin^2\theta + C_{aniso}\sin^2\theta\tan^2\theta, \quad (8)$$

with $$A_{anis}(t_0) = A_{iso}(t_0)$$
$$B_{aniso}(t_0) = B_{iso}(t_0) + \Delta\delta(t_0)/2$$
$$C_{aniso}(t_0) = C_{iso}(t_0) + \Delta\epsilon(t_0)/2. \quad (9)$$

In analogy with equations (4) and (8), embodiments parameterize the angular variation of the seismic data (equation (7)) with $$s_{seis}(t_0,\theta) = [A_{seis}(t_0) + B_{seis}(t_0)\sin^2\theta + C_{seis}(t_0)\sin^2\theta\tan^2\theta]. \quad (10)$$

Embodiments may proceed with the analysis either in terms of band-limited ("wiggle") traces, or as discrete ("sparse-spike") reflectivity impulses. Considering now, an embodiment using discrete reflectivity impulses:

$$\hat{A}_{seis}(t_0) = w * \dddot{A}_{seis}(t_0)$$
$$\hat{B}_{seis}(t_0) = w * \dddot{B}_{seis}(t_0)$$
$$\hat{C}_{seis}(t_0) = w * \dddot{C}_{seis}(t_0). \quad (11)$$

The impulse functions $\dddot{A}_{seis}(t_0)$, $\dddot{B}_{seis}(t_0)$, $\dddot{C}_{seis}(t_0)$ may be found manually or by sparse-spike inversion; and occur only at times $t_0$ for which a correlative event occurs in the isotropic synthetic gather of equation (4). The spikes represent the central peaks (or troughs) of each major event in the zero-phase data, over the logged interval, as a function of angle θ, $\dddot{A}_{seis}(t_0)$, $\dddot{B}_{seis}(t_0)$, $\dddot{C}_{seis}(t_0)$ are found as best fits to these data, of the Aki-Richards form:

$$[\dddot{A}_{seis} + \dddot{B}_{seis}\sin^2\theta + \dddot{C}_{seis}\sin^2\theta\tan^2\theta]. \quad (12)$$

Embodiments apply standard statistical measures to test the confidence with which the low-order terms $\dddot{B}_{seis}(t_0)$, $\dddot{C}_{seis}(t_0)$ are determined. If the seismic data is too noisy, then either or both is poorly determined, and the analysis of such terms should not proceed.

With this subset of events, the resulting reduced seismic gather is written as:

$$\hat{s}_{seis}(t_0, \theta) = \sum_{t_0}[\hat{A}_{seis}(t_0) + \hat{B}_{seis}(t_0)\sin^2\theta + \hat{C}_{seis}(t_0)\sin^2\theta\tan^2\theta] \quad (13)$$

where only the selected events are included in the sum, and $\hat{A}_{seis}(t_0)$, $\hat{B}_{seis}(t_0)$, $\hat{C}_{seis}(t_0)$ are defined in equations (11).

In equations (8)-(13) (unlike in equation (4)), the angles θ are computed from the offsets in the original data, and the estimated velocity function in the overburden. Hence, there exists the possibility of error, from an incorrect velocity profile. In addition, the angles computed from offsets in the conventional manner are ray-angles, and must be converted to wavefront angles θ, using the anisotropy profile in the overburden. Errors made in this computation translate directly into corresponding errors in the coefficients of equation (12). Embodiments compensate for such errors as shown below.

In analogy with the analysis of the seismic data (13), a series of reflectivity spikes are selected (either by manual picking, or by sparse spike inversion) to represent major events in the synthetic data (equation (4)) which correlate with the selected events in equation (11). These spikes are termed $\dddot{A}_{syn}(t_0)$, $\dddot{B}_{syn}(t_0)$, $\dddot{C}_{syn}(t_0)$ and are found from the synthetic data equation (4)) as best-fits of the Aki-Richards form (12). Convolving these spikes with the zero-phase seismic wavelet:

$$\hat{A}_{syn}(t_0) = w * \dddot{A}_{syn}(t_0)$$
$$\hat{B}_{syn}(t_0) = w * \dddot{B}_{syn}(t_0)$$
$$\hat{C}_{syn}(t_0) = w * \dddot{C}_{syn}(t_0) \quad (14)$$

the reduced isotropic synthetic data is formed as:

$$\hat{s}_{syn}(t_0, \theta) = \sum_{t_0}[\hat{A}_{syn}(t_0) + \hat{B}_{syn}(t_0)\sin^2\theta + \hat{C}_{syn}(t_0)\sin^2\theta\tan^2\theta] \quad (15)$$

The seismic gather of equation (13) has the same form as the isotropic synthetic gather of equation (14), with the exception of inclusion in the seismic gather of the (unknown) propagation operator $P(t_0,\theta)$, and including the presence of the anisotropy reflectivity terms in equation (9). Also included in P are the instrumental and computational operators (I and C), which impose large gain factors on the data. The seismic data (equation 13) usually have an absolute maximum value $<10^4$ (called "seismic units", with unknown physical dimensions), whereas the synthetic data (equation 15) usually have an absolute maximum value <1 (nondimensional "reflectivity units"). Embodiments may augment the computational operator C with a multiplicative divisor, to make the amplitudes (of synthetic and seismic) comparable, in order to display them on the same plot. Accordingly, embodiments may multiply all the seismic amplitudes by the factor:

$$N_0 = \langle |\hat{A}_{syn}| \rangle / \langle |\hat{A}_{seis}| \rangle \quad (16)$$

(c.f. equations (11) and (14) where the angle brackets represent an arithmetic average over the selected events in the logged interval, and the vertical bars represent absolute values).

Normally, the adjusted-seismic and synthetic amplitudes will show significant differences from each other, since the seismic data contain the effects of both propagation and of anisotropy, whereas the synthetic data do not.

In the present embodiment (discrete reflectivity impulses), the normalizing functions:

$$N_A(t_0) \equiv \dddot{A}_{syn}(t_0)/N_0 \dddot{A}_{seis}(t_0)$$

$$N_B(t_0) \equiv \dddot{B}_{syn}(t_0)/N_0 \dddot{B}_{seis}(t_0)$$

$$N_C(t_0) \equiv \dddot{C}_{syn}(t_0)/N_0 \dddot{C}_{seis}(t_0) \quad (17)$$

are defined only at the selected values of $t_0$. If the seismic data $\dddot{A}_{aeis}(t_0)$, $\dddot{B}_{aeis}(t_0)$, $\dddot{C}_{aeis}(t_0)$ were to be multiplied by these normalizing functions, the seismic data would be forced to match the isotropic synthetic data, as parameterized in equations (4 and 13).

Instead, embodiments recognize that $N_A(t_0)$, $N_B(t_0)$, $N_C(t_0)$ are time-series, each with a Fourier spectrum. Examining the propagation operator $P(t_0,\theta)$ in equation (7), it is observed that all of the propagation effects included therein accumulate progressively as the wave propagates, hence they contribute to the low-frequency parts of these spectra. By contrast, the reflectivity operator $r(t_0,\theta)$ in equations (7) and (8) fluctuates rapidly in time, contributing only to the high-frequency parts of these spectra.

Hence, embodiments low-cut filter the data time-series, retaining only the high-frequency parts, which are due to the rapidly fluctuating reflectivity $r(t_0,\theta)$. One way to do this is to low-pass filter the normalization functions, obtaining $N_{Alow}(t_0)$, $N_{Blow}(t_0)$, $N_{Clow}(t_0)$, and multiply the seismic amplitudes $\dddot{A}_{seis}(t_0)$, $\dddot{B}_{seis}(t_0)$, $\dddot{C}_{seis}(t_0)$ by the low-pass normalization functions. The resulting amplitudes may be identical to the isotropic amplitudes $\dddot{A}_{syn}(t_0)$, $\dddot{B}_{syn}(t_0)$, $\dddot{C}_{syn}(t_0)$ except for the additive effects of anisotropic reflectivity (cf. equation (8)):

$$N_{Alow}(t_0)N_0 \dddot{A}_{seis}(t_0) - \dddot{A}_{syn}(t_0) = 0 \quad (18a)$$

$$N_{Blow}(t_0)N_0 \dddot{B}_{seis}(t_0) - \dddot{B}_{syn}(t_0) = \Delta\delta/2 \quad (18b)$$

$$N_{Clow}(t_0)N_0 \dddot{C}_{seis}(t_0) - \dddot{C}_{syn}(t_0) = \Delta\epsilon/2 \quad (18c)$$

If equation (18a) is not fulfilled by the data, this is not consistent with the present assumptions, and not interpretable in terms of anisotropy. There are two possible explanations:
 a) The computational operator C has not removed all multiples, and/or
 b) The reflectivity operator $r(t_0,\theta)$ is not a plane-wave/planar reflector operator, such as is given in equation (8).

In the first case, embodiments may remove the multiples, e.g. by an f-k filtering operation, and the analysis repeated. The second case is more fundamental, as it requires a re-assessment of the reflection process. In the following, it is assumed that equation (18a) is respected by the data, with sufficient accuracy.

To convert the computed jumps $\Delta\delta$, $\Delta\epsilon$ in equations (18b)-(18c) to absolute values $\delta$, $\epsilon$, embodiments identify, from the gamma-ray log, an interval of sandstone, and assign $\delta$, $\epsilon=0$ to that sandstone layer. Then embodiments directly find the parameters in the other layers, e.g.:

$$\delta_2 = \delta_1 + \Delta\delta \quad (19)$$

The amplitudes $\dddot{C}_{aeis}(t_0)$ may be poorly determined, since it is common for this curvature parameter to be strongly affected by seismic noise. If the parameters $\epsilon(t_0)$ determined in accordance with embodiments are not reasonable (e.g. $<0$ or $>0.2$), this is the most likely cause.

FIG. 1 shows results of application of an embodiment to an exemplary dataset. FIG. 1 shows the amplitudes $\dddot{B}_{syn}(t_0)$ (15), $N_0 \dddot{B}_{seis}(t_0)$ (equations (12), (16)), and $N_{Blow}N_0 \dddot{B}_{seis}(t_0)$ (equation (18)), for the six major events in the logged interval. (The determination of the seismic parameter $\dddot{C}_{seis}(t_0)$ was not statistically reliable.) As expected, the anisotropic contributions $(N_{Blow}N_0 \dddot{B}_{seis} - \dddot{B}_{syn})$ are significant.

Figure 2:
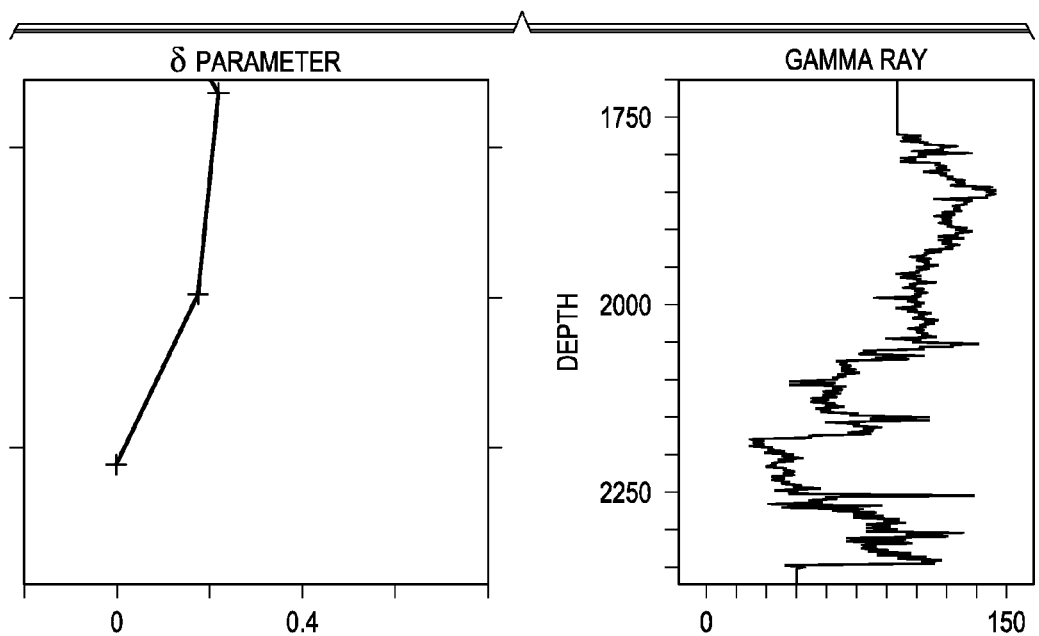
FIG. 2 shows a comparison of a gamma ray log to values of an anisotropy parameter produced in accordance with principles disclosed herein.

FIG. 2 shows values for the anisotropy parameter $\delta$ produced by an embodiment for the exemplary data dataset, compared with the gamma-ray log, and plotted at the same scale. As shown; the correlation is good.

Figure 3:
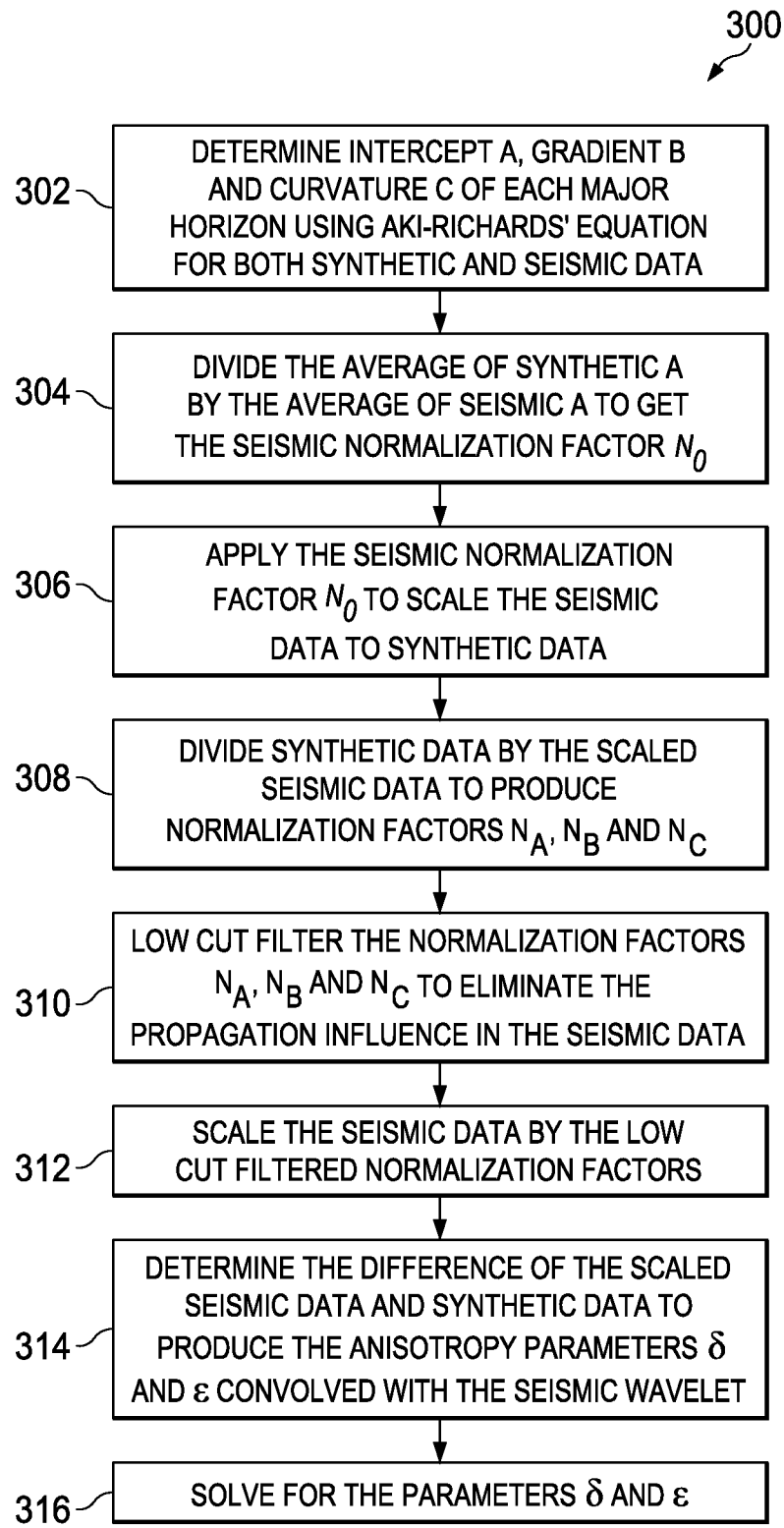
FIG. 3 shows a flow diagram for a method for determining anisotropy parameters in accordance with principles disclosed herein.

FIG. 3 shows a flow diagram for a method 300 for determining anisotropy parameters of a formation in accordance with principles disclosed herein. Though depicted sequentially as a matter of convenience, at least some of the actions shown may be performed in a different order and/or performed in parallel. Additionally, some embodiments may perform only some of the actions shown. In some embodiments, at least some of the method 300, as well as other operations described herein, can be implemented as instructions stored in a computer readable medium and executed by one or more processors.

A seismic data set is acquired using seismic data acquisition instruments known in the art. Similarly, a vertical well log is acquired using well logging instruments known in the art. An isotropic synthetic reflectivity gather is constructed using sonic $V_{P0}$, $V_{S0}$, and $\rho$ from the well log and a seismic wavelet from a CDP gather of the seismic data. In block 302, the intercept A, gradient B, and curvature C are determined for each major horizon of the seismic data, and of the synthetic data. Embodiments may determine intercept A, gradient B, and curvature C in accordance with the Aki-Richards equation.

In block 304, a seismic normalization factor $N_0$ is determined by dividing the average of the synthetic intercept A by the average of the seismic intercept A.

In block 306, the normalization factor $N_0$ is applied to the seismic data to scale the seismic data to the synthetic data.

In block 308, the synthetic data is divided by the scaled seismic data to generated normalization factors $N_A$, $N_B$, and $N_C$.

In block 310, the normalization factors $N_A$, $N_B$, and $N_C$ are low pass filtered to eliminate propagation influence.

In block 312, the seismic data is scaled using the low pass filtered normalization factors.

In block 314, the difference of the scaled seismic data and synthetic data is determined to produce the anisotropy parameters $\delta$ and $\epsilon$ convolved with the seismic wavelet.

In block 316, the anisotropy parameters $\delta$ and $\epsilon$ are determined for the layers of the formation.

Figure 4:
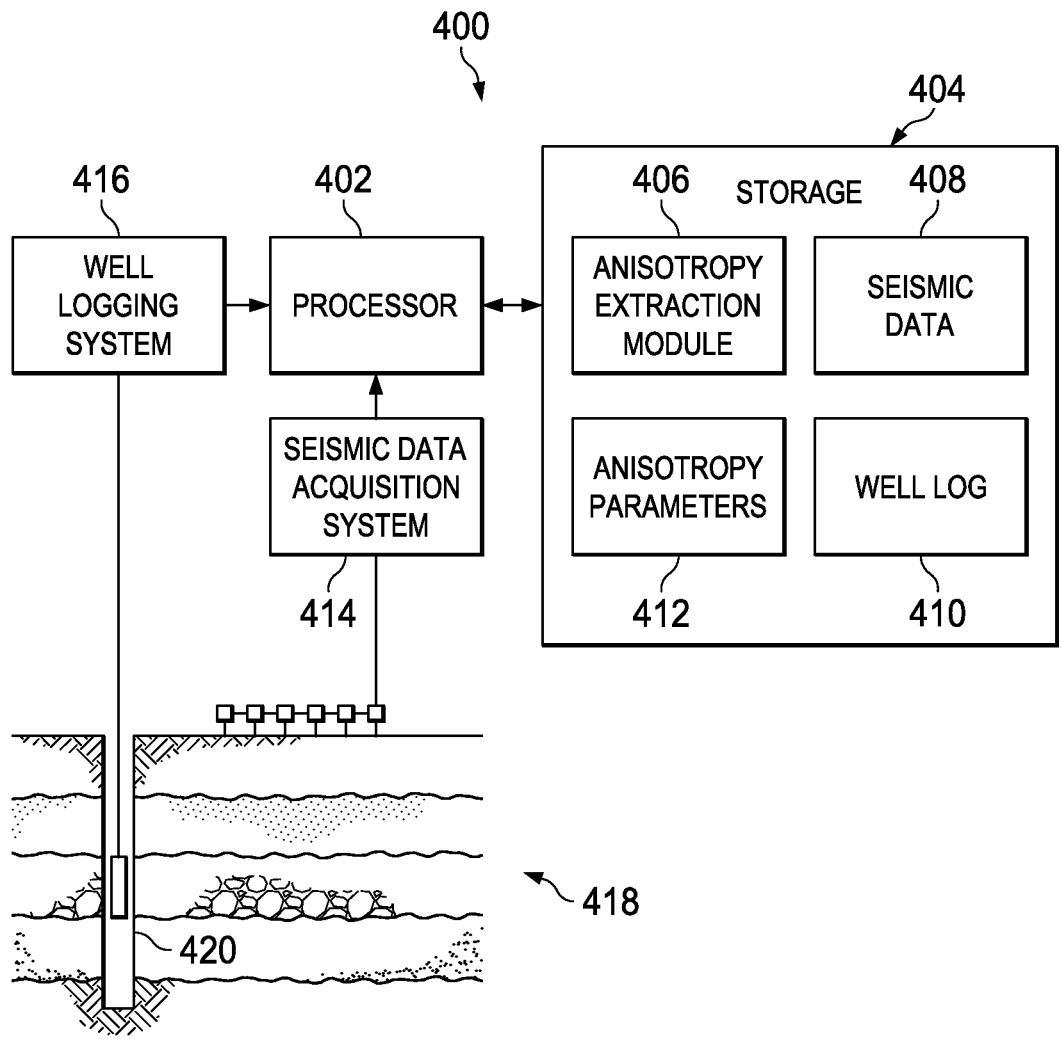
FIG. 4 shows a block diagram of a system for determining anisotropy parameters in accordance with principles disclosed herein.

FIG. 4 shows a block diagram for a system 400 for determining anisotropy parameters of formations 418 in accordance with principles disclosed herein. The system 400 includes a processor 402 and storage 404. The system 400 may also include various other components that have been omitted from FIG. 4 in the interest of clarity. For example, embodiments of the system 400 may include a display device, user input devices, network adapters, etc. Some embodiments of the system 400 may be implemented as a computer, such as a desktop computer, a laptop computer, as server computer, a mainframe computer, or other suitable computing device.

The processor 402 may include, for example, a general-purpose microprocessor, a digital signal processor, a microcontroller or other device capable of executing instructions retrieved from a computer-readable storage medium. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The storage 404 is a non-transitory computer-readable storage medium suitable for storing instructions executed by the processor 402 and data processed by the processor 404. The storage 404 may include volatile storage such as random access memory, non-volatile storage (e.g., a hard drive, an optical storage device (e.g., CD or DVD), FLASH storage, read-only-memory), or combinations thereof.

The storage 404 includes anisotropy extraction module 406. The anisotropy extraction module 406 include instructions that when executed cause the processor 402 to perform the operations disclosed herein for extracting anisotropy parameters. Software instructions alone are incapable of performing a function. Therefore, in the present disclosure, any reference to a function performed by software instructions, or to software instructions performing a function is simply a shorthand means for stating that the function is performed via execution of the instructions by the processor 402.

The storage 404 also includes seismic data 408 provided by the seismic data acquisition system 414, and well log 410 of well 420 provided by the well logging system 416 for processing by the anisotropy extraction module 406. Results of execution of the anisotropy extraction module 406 may be stored in the storage 404 as anisotropy parameters 412.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A method for determining anisotropy parameters of subsurface formations, comprising:
    generating a synthetic reflectivity gather from a vertical well log;
    adjusting times of a surface seismic gather to those of the synthetic gather;
    low-cut filtering the surface seismic gather;
    generating anisotropy parameters as a difference of the filtered seismic gather and the synthetic gather; and
    assigning an anisotropy value to each of a plurality of layers of a formation based on the generated anisotropy parameters.

2. The method of claim 1, further comprising determining an intercept, a gradient, and a curvature for each major horizon of the seismic gather and of the synthetic gather.

3. The method of claim 1, further comprising generating a seismic normalization factor as a ratio of the average of the synthetic gather intercept to the average of the synthetic gather intercept.

4. The method of claim 3, further comprising applying the seismic normalization factor to scale the seismic gather to the synthetic gather.

5. The method of claim 4, further comprising generating normalization functions for an intercept, a gradient, and a curvature as a quotient of the synthetic gather and the scaled seismic gather.

6. The method of claim 5, further comprising:
    low-cut filtering the normalization functions; and
    scaling the seismic gather by the low-cut filtered normalization factors.

7. The method of claim 6, wherein generating anisotropy parameters comprises determining a difference of the scaled seismic gather and the synthetic gather to produce the anisotropy parameter convolved with a wavelet of the seismic gather.

8. The method of claim 1, wherein the assigning comprises:
    identifying a sand layer in the formations; and
    determining the anisotropy value for each of the plurality of layers of the formation relative to the sand layer.

9. A non-transitory computer-readable medium encoded with instructions that are executable to cause a processor to:
    generate a synthetic reflectivity gather from a vertical well log;
    adjust times of a surface seismic gather to those of the synthetic gather;
    low-cut filter the surface seismic gather;
    generate anisotropy parameters as a difference of the filtered seismic gather and the synthetic gather; and
    assign an anisotropy value to each of plurality of layers of a formation based on the generated anisotropy parameters.

10. The computer-readable medium of claim 9, further comprising instructions that are executable to cause the processor to determine an intercept, a gradient, and a curvature for each major horizon of the seismic gather and of the synthetic gather.

11. The computer-readable medium of claim 9, further comprising instructions that are executable to cause the processor to:
    generate a seismic normalization factor as a ratio of the average of the synthetic gather intercept to the average of the synthetic gather intercept; and
    apply the seismic normalization factor to scale the seismic gather to the synthetic gather.

12. The computer-readable medium of claim 11, further comprising instructions that are executable to cause the processor to generate normalization functions for an intercept, a gradient, and a curvature as a quotient of the synthetic gather and the scaled seismic gather.

13. The computer-readable medium of claim 12, further comprising instructions that are executable to cause the processor to:
    low-cut filter the normalization functions; and
    scale the seismic gather by the low-cut filtered normalization factors.

14. The computer-readable medium of claim 12, further comprising instructions that are executable to cause the processor to generate the anisotropy parameters by determining a difference of the scaled seismic gather and the synthetic gather to produce the anisotropy parameter convolved with a wavelet of the seismic gather.

15. The computer-readable medium of claim 13, further comprising instructions that are executable to cause the processor to determine the anisotropy value for each of the plurality of layers of the formation relative to a sand layer of the formation.

16. A system for determining anisotropy parameters of subsurface formations, comprising:

a processor; and anisotropy extraction instructions that configure the processor to:
- generate a synthetic reflectivity gather from a vertical well log;
- adjust times of a surface seismic gather to those of the synthetic gather;
- low-cut filter the surface seismic gather;
- generate anisotropy parameters as a difference of the filtered seismic gather and the synthetic gather; and
- assign an anisotropy value to each of plurality of layers of a formation based on the generated anisotropy parameters.

17. The system of claim 16, wherein the anisotropy extraction instructions configure the processor to determine an intercept, a gradient, and a curvature for each major horizon of the seismic gather and of the synthetic gather.

18. The system of claim 16, wherein the anisotropy extraction instructions configure the processor to:
- generate a seismic normalization factor as a ratio of the average of the synthetic gather intercept to the average of the synthetic gather intercept; and
- apply the seismic normalization factor to scale the seismic gather to the synthetic gather.

19. The system of claim 18, wherein the anisotropy extraction instructions configure the processor to:
- generate normalization functions for an intercept, a gradient, and a curvature as a quotient of the synthetic gather and the scaled seismic gather;
- low-cut filter the normalization functions; and
- scale the seismic gather by the low-cut filtered normalization factors.

20. The system of claim 18, wherein the anisotropy extraction instructions configure the processor to:
- generate the anisotropy parameters by determining a difference of the scaled seismic gather and the synthetic gather to produce the anisotropy parameter convolved with a wavelet of the seismic gather; and
- determine the anisotropy value for each of the plurality of layers of the formation relative to a sand layer of the formation.

* * * * *